(Model.)
W. TRUEMAN.
CURTAIN SLIDE CAMERA ATTACHMENT.
No. 569,895. Patented Oct. 20, 1896.
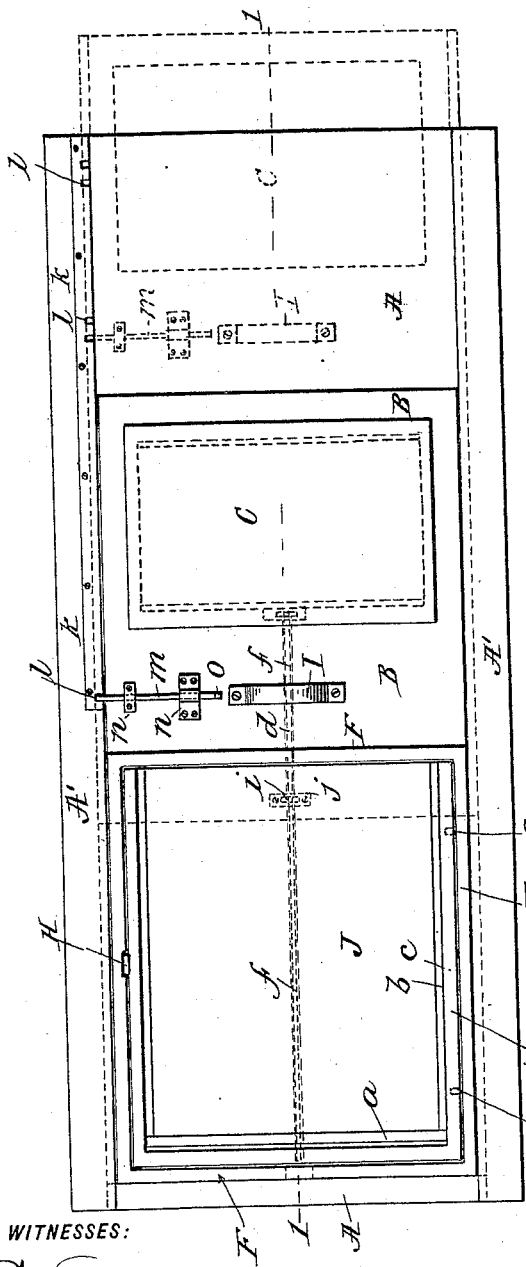
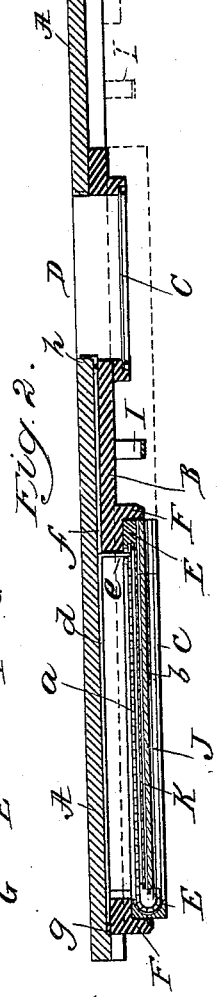
WITNESSES:
Edward C. Rowland
A. B. Morrison
INVENTOR
William Trueman
BY Phillips Abbott
ATTORNEY
THE NORRIS PETERS CO., PHOTO-LITHO., WASHINGTON, D. C.

UNITED STATES PATENT OFFICE.

WILLIAM TRUEMAN, OF NEW HAVEN, CONNECTICUT, ASSIGNOR TO THE E. & H. T. ANTHONY & COMPANY, OF NEW YORK, N. Y.

CURTAIN-SLIDE CAMERA ATTACHMENT.

SPECIFICATION forming part of Letters Patent No. 569,895, dated October 20, 1896.

Application filed December 16, 1895. Serial No. 572,297. (Model.)

*To all whom it may concern:*

Be it known that I, WILLIAM TRUEMAN, a citizen of Great Britain, and a resident of New Haven, in the county of New Haven and State of Connecticut, have invented certain new and useful Curtain-Slide Attachments for Portrait-Cameras, of which the following is a specification.

My invention relates to a photographic apparatus; and it consists in an improved attachment to portrait-cameras whereby a curtain-slide is made to act automatically for exposing and covering the plate; and the invention also embodies various other features, which will be particularly referred to later on.

In the drawings, Figure 1 is a rear elevation of the invention. Fig. 2 is a vertical section thereof on the lines 1 1 of Fig. 1.

In the drawings I do not illustrate the camera, because the method of attaching the devices, such as those embraced in my invention, to portrait-cameras is now so well known that no illustration thereof is needful, and the drawings are made more simple by omitting the camera.

A is the frame of the attachment, A' A' being the slideways attached to the sides of the bases A, as usual.

B is the slide-carriage.

C is the ground glass for focusing.

D is the exposure-aperture.

E is the plate-holder, which rests within a frame F on the slide-carriage, these parts being provided with dowels G G, for the proper retention of one edge of the plate-holder, and with a snap-catch H to hold the other side in position.

I is the handle for sliding the slide-carriage.

J is the usual removable backboard of the plate-holder, provided with springs for pressing against the stopping-ledges.

K represents the sensitized plate.

Referring to the features which especially relate to my invention, $a$ is a curtain slat-slide formed of narrow strips of wood attached to a suitable flexible backing, the edges of which abut against each other, so that the slide is adapted to roll from the front side of the plate around the curved end shown at the left and over upon the back side thereof, being guided by the slotted slideway $b$ $c$.

$d$ is a stiff rod of metal, preferably flat or squared, the end of which is turned upwardly, as at $e$, Fig. 2. It slides in a longitudinal groove $f$, made in the base-board A of the attachment, there being abutments $g$ at one end and $h$ at the other, whereby the sliding motion of the bar $d$ is arrested.

On the front side of the slat-slide there is fastened a metallic plate $j$, having a hole $i$ in it, and the registration of the parts is such that when the locking device, about to be described, is in proper position and the plate-holder inserted in the carriage in the position made necessary by the dowels G then the upturned end $e$ of the sliding part $d$ will enter the opening $i$ in the plate $j$.

The locking devices just referred to are as follows: $k$ is a metallic strip fastened to one of the slideways A', preferably the upper one, as shown. In its edge there are a number of notches $l$ $l$, &c. $m$ is a latch which is attached to the carriage and is guided in its movement by the bearing-plates $n$ $n$. It preferably has a spring on its under side whereby its movement under the action of gravity is arrested. The inner end of this latch is turned upwardly, as at $o$, for convenient manipulation.

The operation of the apparatus is as follows: The latch $m$ is first engaged with the notch $l$ in the plate $k$ which is farthest to the left, so that the sliding carriage is locked and held in its position farthest to the left. The slat-slide being in position to cover the plate, it, the sensitized plate, is put in position within the holder and the back plate J is closed. The holder is then introduced into the carriage by proper entering of the dowels G G within the holes made for them in the plate-holder, and the spring-catch H being properly engaged with the opposite edge of the holder the latter is rigidly held in position, and during the placing of the plate-holder within the carriage, as just described, the upwardly-turned end $e$ of the sliding bar $d$ enters the hole or slot $i$ in the plate $j$, attached to the front side of the forward edge of the slat-slide. Now, to make an exposure, the latch $m$ is withdrawn and the carriage is moved to the right, toward the exposure-aperture. During this movement the focusing ground glass passes away from the exposure-aperture and the bar $d$ slides with the other parts until its right-hand end is arrested by the stop $h$, which is just at the edge of the exposure-aperture. Thereupon the pressure of the upturned end $e$ of the sliding bar upon the sides of the hole in the plate $j$ strips the curtain slat-slide from in front of the sensitized plate, so that as the carriage continues to move to the right the slide curls around the curved guideway at the left of the holder and passes to the rear side of the plate. Thus it is exposed and the picture is taken. Thereupon the carriage is again returned to its primary position, during which the bar $d$ slides in the reverse direction until its left-hand end is arrested by the stop $g$, whereupon the curtain slat-slide is again moved in reverse direction around, so as to cover the face of the plate, fully protecting it.

I show in dotted lines the position of the carriage and the parts carried by it, the latch being located in one of the intermediate notches in the plate. This is for the purpose of making two exposures upon the same plate, if desired. The notches are made close together, so as to leave a line of demarcation between the two exposures.

It will of course be apparent to those who are familiar with this art that there may be such number of these notches as preferred, so that any desired number of exposures may be made upon the same plate. The slide, in conjunction with the base-board of the carriage, will protect all portions of the plate excepting that opposite the exposure-aperture.

Among the advantages secured by me are the following: Absolute certainty of exposure. The plate can be divided into as many exposures as may be desired. There are no projecting parts on the outside of the apparatus whereby the slide can be accidentally moved. (This is one of the principal objections to all previous devices.) The simplicity of the construction; the permanent protection of the slide within the plate-holder; the automatic operation of the curtain slat-slide by the movement of the carriage; locking devices for the carriage whereby exact registration is secured between it and the holder.

Some of the above-mentioned advantages have been attained partially by prior devices, but none of them, so far as known to me, secure the desired results as advantageously as I have secured them.

It will be obvious to those who are familiar with this art that modifications can be made in the details of construction of the parts comprising my invention without departing from the essentials thereof. I do not, therefore, limit myself to such details.

I claim—

1. In a camera attachment, the combination of a frame, a sliding carriage within the frame, a plate-holder, a slat-slide inclosed within the plate-holder and a device upon the frame of the attachment, which engages with the front edge of the slide, and automatically manipulates it upon movement of the carriage, for the purposes set forth.

2. In a camera attachment, the combination of a frame, a sliding carriage within the frame, a plate-holder, a slat-slide inclosed within the plate-holder, and a device located upon the frame of the attachment behind the plate-holder, which engages with the slide, and automatically manipulates it upon the movement of the carriage, for the purposes set forth.

3. In a camera attachment, the combination of a frame, a sliding carriage within the frame, a plate-holder, a slat-slide inclosed within the plate-holder, and a device located upon the frame and in rear of the plate-holder, which engages with the front edge of the slat-slide, and automatically manipulates it upon movement of the carriage, for the purposes set forth.

4. In a camera attachment, the combination of a plate-holder, a sliding carriage adapted to receive and hold the plate-holder, a slat-slide inclosed within the plate-holder, and a sliding device in the rear of the plate-holder, and centrally located relative thereto, which engages with the front end of the slide, for the purposes set forth.

5. In a camera attachment, the combination of a frame, a sliding carriage, a plate-holder, a slat-slide inclosed by the plate-holder, a sliding device upon the frame of the attachment, located behind the plate-holder and centrally located thereon, which engages with the front edge of the slide, and means to limit the movement of said sliding device, for the purposes set forth.

6. In a camera attachment, the combination of a sliding carriage adapted to receive a plate-holder, a plate-holder, a slat-slide inclosed within the plate-holder, and means to actuate the slide, which during the operation of the attachment, is at all times substantially covered and protected by the plate-holder, for the purposes set forth.

7. In a camera attachment, the combination of a sliding carriage adapted to receive a plate-holder, a plate-holder, a slat-slide inclosed within the plate-holder and a sliding device located upon the frame and which engages with the front edge of the slat-slide, and which, when the attachment is in operation is at all times, substantially covered and protected by the plate-holder and coactive parts, for the purposes set forth.

8. In a camera attachment, the combination of a frame, a sliding carriage, a plate-holder, a curtain slat-slide inclosed within the plate-holder, a device upon the frame of the attachment which engages with the front edge of the slide, and manipulates it upon movement of the carriage, and a device for determining the position of the carriage relative to the said device, for the purposes set forth.

9. In a camera attachment, a sliding frame, a plate-holder, means to determine the position of the plate-holder in the carriage, a slat-slide inclosed within the frame of the holder, means upon the front edge of the slide, whereby it may be engaged by a sliding device upon the frame of the attachment, and said sliding devices adapted to engage with said means, for the purposes set forth.

10. In a camera attachment, the combination of a frame, a sliding carriage within the frame, means to determine the position of the carriage relative to the frame of the attachment, a plate-holder, means to determine the position of the plate-holder relative to the carriage, a slide for the plate-holder, a device upon the frame, which engages with the front edge of the slide, and which lies behind and is protected by the plate-holder, for the purposes set forth.

11. In a camera attachment a slide for a plate-holder, a sliding device upon the frame of the attachment for manipulating said slide, which is covered and protected by the slide, and means to limit the movement of said sliding device, for the purposes set forth.

12. In a camera attachment, the combination of a frame, a sliding carriage within the frame, a plate-holder, a slide for the plate-holder, a rod adapted to slide in a groove in the frame, a portion of which projects outwardly and engages the front of the slide, means upon the slide to receive said part of the rod, and stops to limit the movement of the rod, for the purposes set forth.

Signed at New Haven, in the county of New Haven and State of Connecticut, this 6th day of December, A. D. 1895.

WILLIAM TRUEMAN.

Witnesses:
  HARRY W. ASHER,
  JOS. R. MANNING.